(12) United States Patent
Gonzalez et al.

(10) Patent No.: US 6,474,414 B1
(45) Date of Patent: Nov. 5, 2002

(54) PLUG FOR TUBULARS

(75) Inventors: Manuel Eduardo Gonzalez, Kingwood; Mark D. Looney, Meadows Place; Robert B. Carpenter, Sugar Land; Philip D. Fader, Houston, all of TX (US)

(73) Assignee: Texaco, Inc., White Plains, NY (US)

( * ) Notice: Subject to any disclaimer, the term of this patent is extended or adjusted under 35 U.S.C. 154(b) by 0 days.

(21) Appl. No.: 09/522,211

(22) Filed: Mar. 9, 2000

(51) Int. Cl.[7] .............................................. E21B 33/13
(52) U.S. Cl. ......................... 166/277; 166/288; 166/57; 166/192
(58) Field of Search ................... 166/277, 288, 166/302, 57, 292, 192, 195

(56) References Cited

U.S. PATENT DOCUMENTS

| | | |
|---|---|---|
| 1,921,809 A | 8/1933 | Crain |
| 3,638,730 A | 2/1972 | Smith .......................... 166/291 |
| 3,697,377 A | 10/1972 | Gavthron |
| 3,996,100 A | 12/1976 | Oguma et al. |
| 4,275,788 A * | 6/1981 | Sweatman .................... 166/292 |
| 4,417,625 A * | 11/1983 | Henson et al. ............... 166/387 |
| 4,489,784 A * | 12/1984 | Messenger .................... 166/288 |
| 4,519,452 A * | 5/1985 | Tsao et al. ................... 166/288 |
| 4,612,959 A | 9/1986 | Costello |
| 4,691,775 A | 9/1987 | Lustig et al. ................ 166/317 |
| 5,154,230 A * | 10/1992 | Dees ............................ 166/277 |
| 5,159,983 A | 11/1992 | Barron et al. ................ 166/379 |
| 5,607,017 A | 3/1997 | Owens et al. ................ 166/288 |
| 5,833,001 A * | 11/1998 | Song et al. ................... 166/287 |
| 5,963,580 A | 10/1999 | Eckert |

* cited by examiner

Primary Examiner—William Neuder
(74) Attorney, Agent, or Firm—John R. Casperson

(57) ABSTRACT

A molten metal plug which expands upon solidification can be used to form a pressure resistant seal in a tubular such as is used in oil and gas exploration and production.

47 Claims, 4 Drawing Sheets

PLUG FOR TUBULARS

BACKGROUND OF THE INVENTION

In one aspect, this invention relates to a plug for tubulars. In another aspect, this invention relates to a pipe plug that is formed in the pipe. In yet another aspect, this invention relates to a pipe plug that is particularly useful for forming barriers downhole, such as downhole in oil and gas wells. In yet another aspect, this invention relates to a method for isolating pipe sections from each other. In a further aspect, this invention relates to a method for isolating a subterranean formation from a section of a pipe passing through the formation. In a further aspect, this invention relates to isolating one subterranean formation from another subterranean formation.

Pressure seals to isolate formations in a well are currently performed through the use of bridge mechanical plugs. It can be necessary to isolate formations, for example, where it is desired to flow fluid though one set of perforation in the well casing but not another set. This can be needed, for example, in fracturing operations. Isolation can also be needed, for example, in offshore situations where a zone is to be abandoned, and a re-completion to an upper zone (below the packer) is expected.

The bridge plugs currently used for such applications are mechanical devices that grab the casing walls by the use of slips, and isolate the pressure through the use of elastomers (that energize when the seals are deployed). For these types of bridge plugs to work under high differential pressures, the bridge plug body must have an outside diameter (OD) very close to the casing inside diameter (ID). Bridge plugs that are of small OD but expand to a large OD would be very valuable to the industry. This is because they could be run through the existing tubing and expanded to set in the casing. This operation could be accomplished without pulling the tubing, which is a very expensive operation. Unfortunately, these types of expandable mechanical bridge plugs cannot reliably withstand differential pressures of more than 3,500 psi (differential pressures), and differential pressures of between 3,500 and 15,000 psi are normally encountered.

A pressure seal that could be introduced through narrow passages and form a reliable seal would be very desirable.

A pressure seal that could reliably withstand a differential pressure of 3500 psi would be very desirable.

A pressure seal that has an OD which can conform to irregularities in its confining walls would be also very desirable.

Another problem encountered in the oil and gas industry is the pressurization of the annular space between two casing strings in a well. Where the pressurization reaches the surface, it must be removed. A technique to isolate the uphole portion of the annulus from fluid pressure in downhole portions of the annulus would be very desirable.

Other needs in the industry which can be met by the invention include:

An ability to pressure seal lateral junctions on horizontal wells;

The ability to plug open perforations that produce unwanted production in a well;

The ability to repair corroded, worn or damaged well casing;

The ability to control pressure in well control situations and blow-outs.

SUMMARY OF THE INVENTION

In one embodiment of the invention, there is provided a tubing containing a plug which was cast in the tubing.

In another embodiment of the invention, there is provided a method for isolating a first volume from a second volume by positioning a molten mass of material in a passage between the two volumes and permitting the mass to solidify and cool so as to form a highly pressure resistant seal across the passage.

Another embodiment of the invention provides a packer apparatus which is well suited to the practice of the above embodiments. The apparatus is provided in the form of a flexible container having a generally cylindrical sidewall and a bottom end closure. A mass of soldering composition is positioned in the container. An electrical resistance heating element is positioned adjacent to the mass of soldering composition. The electrical heating element can be activated to melt the soldering composition, and then deactivated to permit the soldering composition to solidify and seal. When removal of the packer is desired, the electrical heating element can be reactivated to remelt the solder and release the packer.

DETAILED DESCRIPTION OF THE INVENTION

Figure 1:
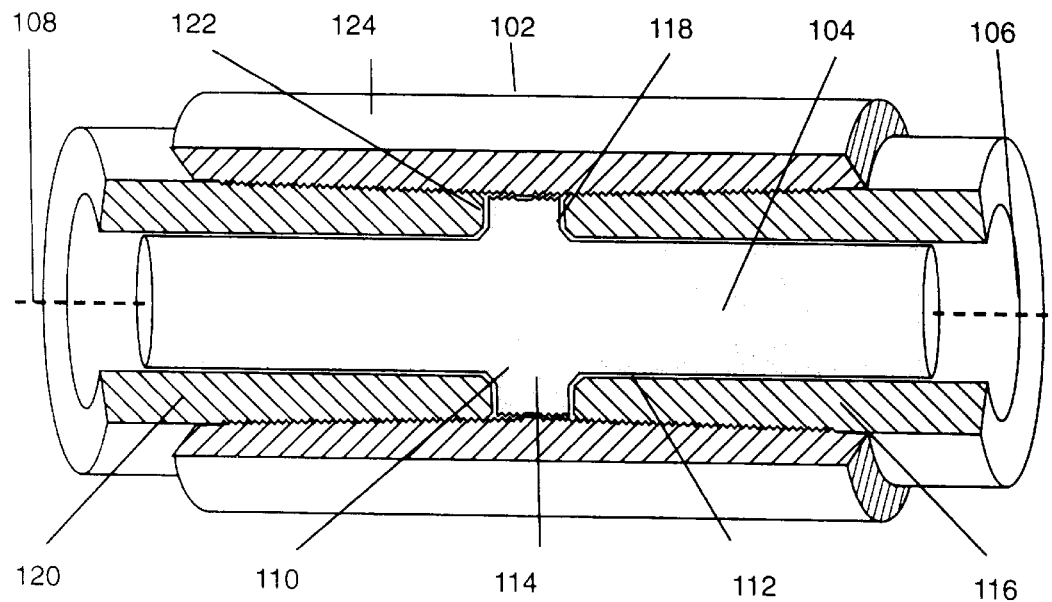
FIG. 1 is a sectional view illustrating the invention being employed in a standard pipe connection.

In the method of one embodiment of the invention, a molten mass of material is positioned in a passage and permitted to solidify. If desired, the method can be employed to form a highly pressure resistant seal between a first inside portion of a tubing and a second inside portion of the tubing.

Materials suitable for use in this embodiment of the invention generally include most any material that will solidify under locally ambient conditions around the tubing and form a plug having sufficient strength and bond to withstand the pressure differential across the plug. Preferably, the plug forms a tight mechanical pressure seal. This can be accomplished by either or both of selecting a molten mass of metal which expands as it solidifies and/or heating the tubing sufficiently so that it will diametrically shrink adequately to form the tight mechanical pressure seal as it cools. The former can be facilitated by selecting a soldering composition which contains least 10 parts per hundred, preferably at least 30 parts per hundred, and most preferably, at least 50 parts per hundred, of Bismuth. The second can be facilitated by heating the tubing to relatively high temperatures, such as in the range of 600–1100 F, and, if desired, employing a brazing composition to form the plug.

For downhole applications, locally ambient temperatures can range from about –40 to about 1,000 F (or higher, but such temperatures are not compatible with desirable liquid hydrocarbon products). Generally, downhole temperatures will range from about 32 F to about 700 F and will often be in the range of from about 100 F to about 650 F. Locally ambient pressures can range from 14.7 psi to 20,000 psi (or higher), but will generally range from about 14.7 to 15,000 psi and are usually in the range of from 14.7 to 10,000 psi.

Suitable materials will generally comprise a high percentage, generally in excess of 90% by weight of metals and will exhibit a melting point of less than 1100 F, generally in the range of 100 to 1000 F. Generally speaking, it is preferable that the materials be relatively soft, so that they can be easily drilled out. Soldering compositions are generally suitable for most applications. Most suitable soldering compositions are metal alloys. As noted above, it is also desirable to have materials that expand when changing from a molten state to a solid state.

Preferred solders for use at ambient temperatures in the range of 150–600 F can comprise chiefly bismuth with optional lead, tin, and silver. Some examples from the Handbook of Chemistry and Physics, 54th edition, 1973–1974 (CRC Press, Cleveland, Ohio) include 25 Pb/25 Sn/50 Bi (266 F liquidus temperature), 25 Pb/50 Sn/25 Bi (336 F liquidus temperature)

50 Pb/37.5 Sn/12.5 Bi (374 F liquidus temperature)

60 Pb/40 Sn (460 F/361 F liquidus/solidus temps) (AWS-ASTM classification 40A)

85 Pb/15 Sn (550 F/440 F liquidus/solidus temps) (AWS-ASTM classification 15B)

97.5 Pb/2.3–2.7 Ag (588 F/588 F liquidus/solidus temps) (AWS-ASTM classification 1.5S)

In the table just given, constituents present at less than 1 part per hundred are not listed.

For applications in the 600–1000 F range, preferred solders comprise chiefly aluminum or magnesium-containing brazing materials: Examples (from CRC) include 11.0–13.0 Al/4.5–5.5 Zn/bal. Mg.
(liquidus/solidus temps 1050/770 F) (AWS-ASTM classification 1.5S)

8.3–9.3 Al/1.7–2.3 Zn/bal. Mg
(liquidus/solidus temps 1110/830 F) (AWS-ASTM classification BMg-1)

3.3–4.7 Cu/9.3–10.7 Si/bal. Al
(liquidus/solidus temps 1085/970 F) (AWS-ASTM classification BAlSi-3)

In the table just given, constituents present at less than 1 part per hundred are not listed. U.S. Pat. No. 4,561,300 discloses a wide range of suitable materials having melting points between 76 C and 351 C. Examples include

| COMPOSITION | melting point ( C) |
|---|---|
| Bi 48.5, In 41.5, Cd 10 | 076 |
| In 52.34, Bi 47.66 | 088 |
| Bi 52.5, Pb 32, Sn 15.5 | 096 |
| Bi 54, Sn 26, Cd 20 | 103 |
| Bi 67, In 33 | 110 |
| In 52, Sn 48 | 118 |
| Bi 56.5, Pb 43.5 | 126 |
| Bi 56, Sn 40, Zn 4 | 133 |
| Bi 60, Sn 40 | 139 |
| Bi 60, Cd 40 | 147 |
| Sn 68.35, Cd 29.25, Zn 2.4 | 159 |
| Sn 71, Pb 24, Zn 5 | 170 |
| Sn 67.75, Cd 32.25 | 175 |
| Sn 62.5, Pb 36.15 | 180 |
| Sn 61.9, Pb 38.1 | 184 |
| Sn 91, Zn 9 | 198 |
| Sn 91, Mg 9 | 205 |
| Sn 95.8, Ag 3.5, Cu 0.7 | 218 |
| Sn 96.5, Ag 3.5 | 222 |
| Sn 99.5, Al 0.5 | 229 |
| Sn | 231 |
| Sn 99.41, Cu 0.32, Al 0.27 | 234 |
| Pb 79.7, Cd 17.7, Sb 2.6 | 239 |
| Pb 84, Sb 12, Sn 4 | 243 |
| Pb 82.6, Cd 17.4 | 249 |
| Pb 88.9, Sb 11.1 | 253 |
| Bi 97.3, Zn 2.7 | 256 |
| Bi 97.5, Ag 2.5 | 263 |
| Cd 82.6, Zn 17.4 | 265 |
| Bi | 273 |
| Pb 91, Sb 4.68, Cd 4.32 | 276 |
| Ga 92, Mg 18 | 285 |
| Cd 92.45, Sb 7.55 | 294 |
| Pb 96.97, Ag 2.20, Sb 0.83 | 301 |
| Pb 97.5, Ag 2.5 | 303 |
| Pb 97.55, Ag 1.75, Sn 0.7 | 311 |
| Pb 98.1, Sb 1, Zn 0.9 | 315 |
| Pb 97.4, Sn 2.6 | 320 |
| Pb 98.76, Sn 1.24 | 325 |
| Pb | 329 |
| Zn 92.97, Al 4.08, Mg 2.95 | 344 |
| Te 70.6, Ag 29.4 | 351 |

Other suitable materials having a yield temperature over the range of 105 F to 357 F are commercially available from, for example, Cerro Metal Products Co. of Belefonte, Pa. Examples include:

| COMPOSITION | yield temperature (F) |
|---|---|
| 42.91 Bi/21.70 Pb/7.97 Sn/5.06 Cd/18.33 In/4.00 Hg | 105 |
| 49.0 Bi/18.0 Pb/12.00 Sn/21.00 In | 138 |
| 50.00 Bi/26.70 Pb/13.30 Sn/10.00 Cd | 158 |
| 50.31 Bi/39.2 Pb/1.5 Sn/7.99 Cd/1.00 In | 181 |
| 56.00 Bi/22.00 Pb/22.00 Sn | 205 |
| 33.33 Bi/33.34 Pb/33.33 Sn | 232 |
| 25.50 Bi/14.5 Pb/60.00 Sn | 270 |
| 20.00 Bi/50.00 Pb/30.00 Sn | 293 |
| 10.00 Bi/40.00 Pb/50.00 Sn | 324 |
| 95.00 Bi/5.00 Sn | 357 |

In the oil and gas industry, the invention will often be employed to form a seal in a tubing that extends generally downwardly into the earth. It is generally first necessary to remove standing liquids from the location where the plug is desired.

This can be done by the injection of gas at the wellhead. For example, the well can be bullheaded with nitrogen and the well liquids, if any, can be displaced to the perforations. Once the liquids have been removed, the invention can be carried out by positioning a platform for the molten metal in the tubing and forming a pool of the molten metal on the platform. A plastic bridge plug or other form of support such as a a sand plug-back can provide a suitable platform. In a production tubing, the platform is preferably positioned slightly below a joint in the tubing, so that the molten material will flow into recesses which typically exist in the vicinity of the joints to more tightly secure the plug. In an annulus between the production tubing and the casing, the platform can be provided by the upper surface of the cement which fills the lower portion of the annulus. A column of high density particulates can also be placed ahead of eutectic material to adjust platform height or act as a bridging agent. The particulates prevents loss of the molten solder through incompetent tubing/casing packers or other leak paths. Preferably, a column of high density particulate material, such as sand or barite, is positioned on top of the molten material, to maximize radial expansion of the material as it solidifies. The solder can be placed in the well in either particulate or molten form. Either column of particulate material or solder can be entroduced into the well in dryform or slurried in a liquid. If slurried, it can be placed in a dump bailer, through tubing, introduced at wellhead and allowed to free-fall to position, or by any other means of transport., The molten pool can be formed by a variety of techniques. For example, it can simply be poured onto the platform in liquid or molten form, such as from an insulated wire-line bailing tool or through insulated or concentric-tubing. which empties near the platform. Concentric tubing can be gas-filled for insulation or heated by pumping a high temperature fluid between tubing walls. Alternatively, electrical resistance heating could be employed to melt the material in situ. For example, the material could be conveyed into position in particle form, and melted in situ, such as by an electrical heating element. Another option would be to employ a solid bar of the material which contains an electrical heating element and melting the bar to provide the molten pool. The electrical heating element could be in the form of a probe which can be lowered into position using an oil field electric wireline unit. The probe can then be heated to melt the material and can then be removed prior to permitting the molten material to solidify. In another embodiment of the invention, a self-contained unit containing the material to be melted can be placed, used, and retrieved as desired. In this embodiment, a soldering composition which expands upon solidification is used. A flexible container of the soldering composition is lowered into a desired position in the tubing. The container has a bottom end closure which forms the platform. The pool of molten material is formed in the container. Preferably, the container has a generally cylindrical sidewall. The molten material expands as it solidifies so as to urge at least a portion of the sidewall of the container into sealing relationship with the inside surface of the tubing. The sidewall is preferably at least partially formed from a synthetic polymer material, such as a high temperature rubber, or a ductile metal, such as copper or aluminum.

Where it is desired to isolate sections of an annulus, such as between a production tubing and a casing, the platform will generally be positioned so as to extend across the annulus between the outer tubing and the inner tubing. This application can be of high importance when attempting to remove pressure (as dictated by many government regulations) from any annular space at the surface of a well. This pressure generally comes from faulty or inadequate cement coverage in the annulus, leaking casing-tubing packers, or leaking tubing and casing connections. Particles of the selected material could be positioned on the platform and melted in situ, such as by the application of heat through the wall of the inner tubing by an electrical heating element positioned on the inside of the inner tubing at a longitudinal position alongside the material to be melted. In this application, the top of the cement or placed particulates may form the platform, and the solder particles simply poured into the annular space. Preferably, the pool is formed against a joint in the tubing so that flow of the molten material into the recesses or will form itself into a shoulder or flange to form a metal to metal seal that will act as a barrier to unwanted pressure and production. This technique can also be applied to other leaks in the well annulus, such as liner-topleaks and casing-tubing packers. In this embodiment of the invention, the solder particulates can be tagged with a material such as boron or a radioactive isotope that can be remotely located with devices such as pulsed neutron or gamma ray logging tools. This method allows remote confirmation of position and extent of coverage before applying heat to melt solder.

Figure 2:
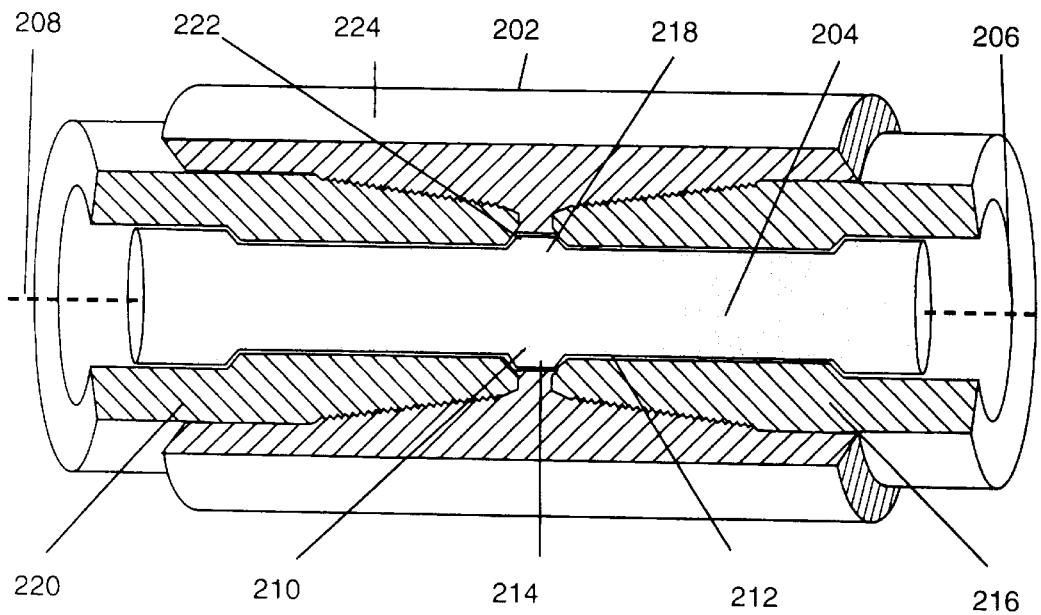
FIG. 2 is a sectional view illustrating the invention being employed in a premium pipe connection.
Figure 3:
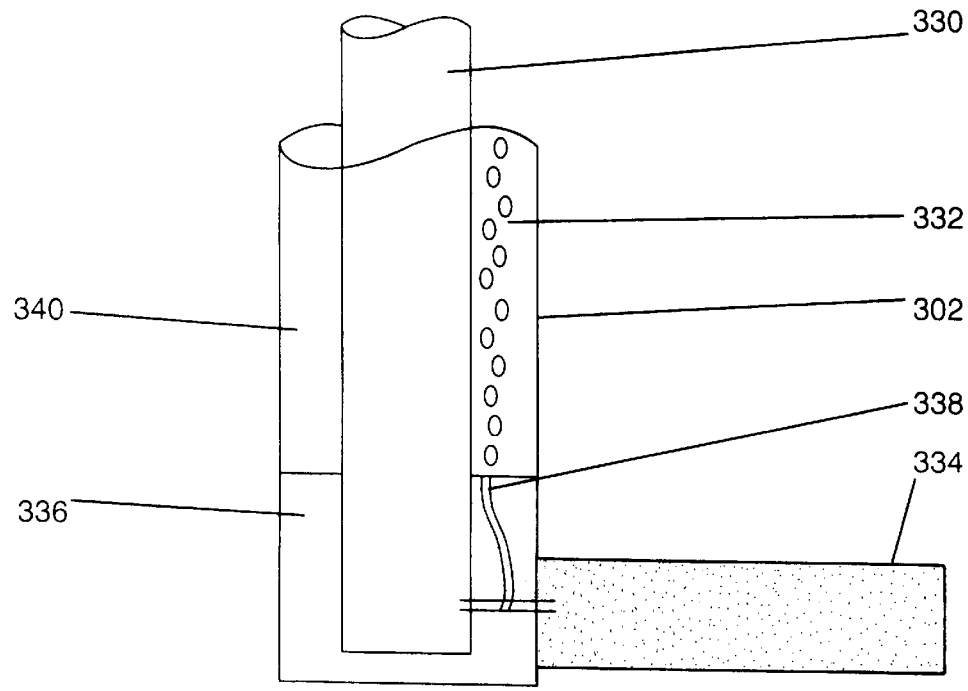
FIGS. 3–5 schematically illustrate a method of the invention being employed to seal a tubing annulus.
Figure 4:
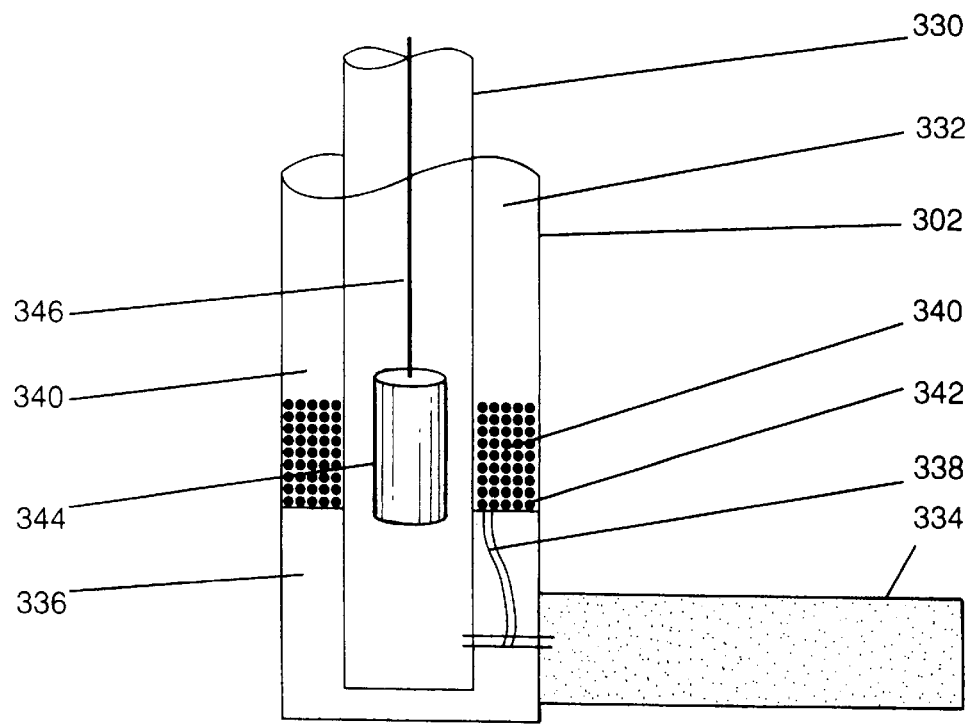
Figure 5:
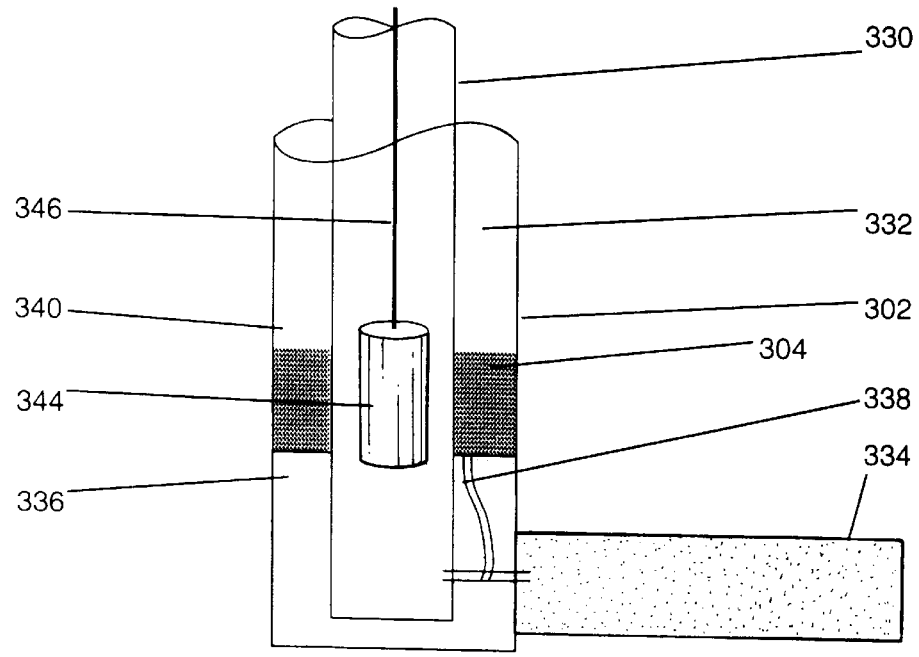

Referring now to FIGS. 1 and 2, reference call outs in FIG. 1 are in the 100 series, reference call outs in FIG. 2 are in the 200 series, and reference call outs in FIGS. 3–5 are in the 300 series. These Figures show a tubing 102, 202, 302 containing a plug 104, 204, 304 which was cast in the tubing.

The tubing is almost always formed from steel and in the oil and gas upstream business is usually in the form of a tubing string. The plug is usually formed from metal solder and forms a seal across the passage defined by the tubing.

Referring now to FIGS. 1 and 2, the tubing is formed from a sidewall having an inside surface 106, 206 and a longitudinal axis 208, 208. The inside surface of the tubing defines at least one recess 110, 210 leading away from the longitudinal axis. The plug is positioned so that metal extends into the recess.

The inside surface 106, 206 of the tubing is preferably generally cylindrically shaped. The plug 104, 204 has an outside surface 112, 212 which conforms to the generally cylindrical inside surface of the tubing, and at least one generally radially extending protrusion 114, 214 which conforms to the inside portion of the tubing which defines the recess.

In the illustrated embodiments, the tubing is formed from a first pipe section 116, 216 having a first end 118, 218, and a second pipe section 120, 220 having a first end 122, 222. A collar 124, 224 joins the first pipe section to the second pipe section with the first end of the first pipe section facing :the first end of the second pipe section. The recess 110, 210 is annularly shaped and is formed between the first end of first pipe section and the first end of the second pipe section. The plug is cast so that metal has flowed into the annular recess and formed a generally radially outwardly extending flange on the plug. The outer tubing may also be the inner walls of the drilled hole. The rugosity or undulating surface of the drilled subterranean formation effect an outer seal surface.

In FIG. 2, the first pipe section has a first portion having a first diameter adjacent to the first end and a second portion having a second diameter which is larger than the first diameter which is spaced apart from the first end. The second pipe section is reciprocally shaped. The plug has a first end which is positioned in the second portion of the first section and a second end which is positioned in the second portion of the second section. The plug thus effectively has a mid-flange and two end flanges and can only be displaced after its destruction.

In FIGS. 3–5, a second pipe 330 is positioned inside of the pipe 302 to define an annulus 332. The pipe 302 is an outside pipe and the second pipe 330 is an inside pipe. The plug 304 is positioned in the annulus 332. The inside pipe and the outside pipe extend downwardly into the earth and generally communicate with an oil or gas reservoir formation 334. A lower portion 336 of the annulus is filled with a cementitious material. Sometimes, the cementitious material fails, (see fracture 338) permitting fluid flow from the reservoir to the wellhead via the annulus. In accordance with the invention, the plug 304 is positioned above the cementitious material. Preferably, the plug rests on the top of the cementitious material and seals an upper portion 340 of the annulus from the lower portion.

In the sequence shown by FIGS. 3–5, the plug is formed in situ by evacuating the tubing of fluids such as by nitrogen pressurization and positioning a mass 340 of beaded, pelleted or other particle form soldering composition on the upper surface 342 of the cement 336. A heater 344 is suspended in the inner tubing 330 adjacent the mass 340 on an electric wireline 346. The heater is activated to melt the mass and form the plug as shown in FIG. 5.

Figure 6:
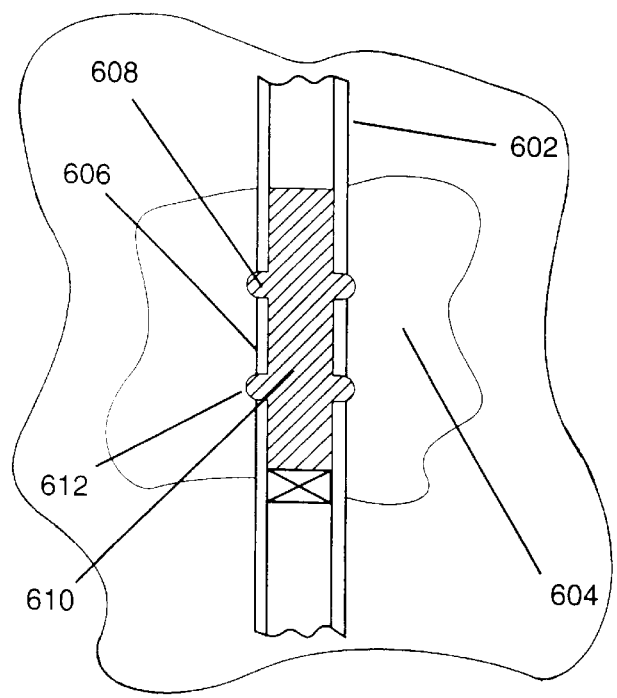
FIG. 6 illustrates schematically the use of one embodiment of the invention.

In FIG. 6, a tubing 602 extends downwardly into the earth into a fluid production zone 604.

The tubing has a section 606 which is perforated to define passages 608 which lead from the inside to the outside of the pipe, and the plug 610 is positioned in the perforated section of the pipe.

The plurality of perforations form recesses in the generally cylindrical inside surface of the pipe.

The plug has a plurality of protrusions 612 which extend into the perforations to isolate the inside of the pipe from the outside of the pipe. If necessary, the perforations can be sealed with balls from within the production line or backed up with sand in the annulus to facilitate obtaining a tight seal.

Figure 7:
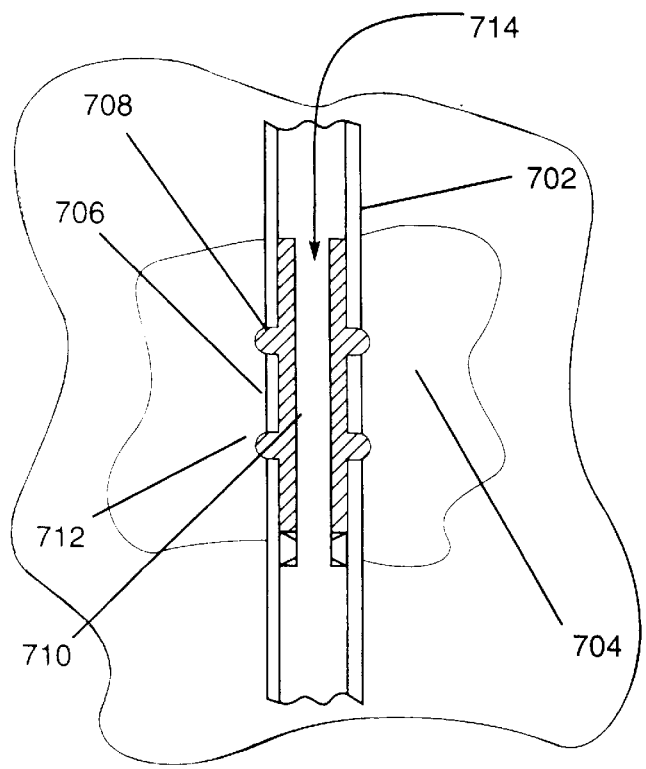
FIG. 7 illustrates schematically the use of another embodiment of the invention.

In FIG. 7, a tubing 702 extends downwardly into the earth into a fluid production zone 704.

The tubing has a section 706 which is perforated to define recesses 708 which may be perforations as illustrated which lead from the inside to the outside of the pipe, or simply corrosion pitting or a mechanically damaged section of the tubing, and the plug 710 is positioned in the section 706 of the tubing. The plug has a plurality of radially outwardly extending protrusions 712 which extend into the recesses so that it is securely fastened in the tubing. A passage 714 has been drilled longitudinally through the plug 710, so that the plug forms a tubularly shaped repair body. If desired, the tubularly shaped repair body can be formed from a brazing material for greater strength. Acid wahes or boron-tagged solder or brazing compounds can serve as metal-surface preparation aids and increase adhesion to metal surfaces while permitting detection with logging tools.

Figure 8:
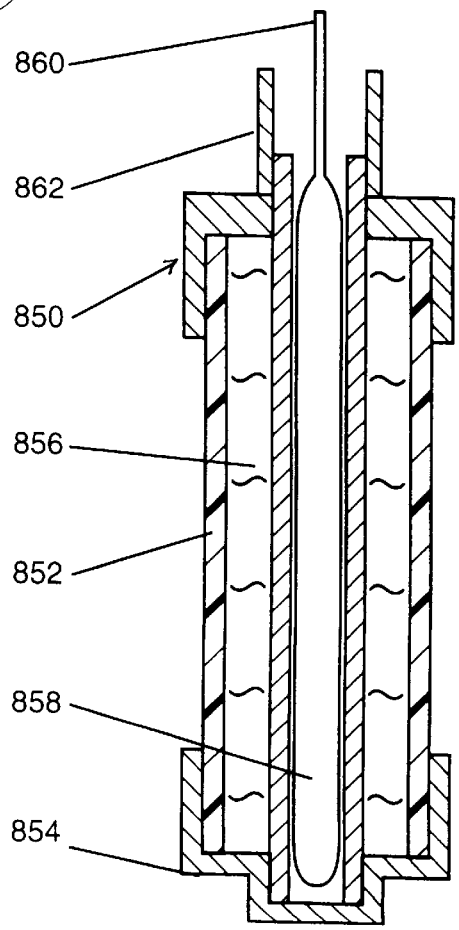
FIG. 8 illustrates, in cross section and partly schematically, a packer tool in accordance with an embodiment of the invention.

With reference to FIG. 8, a packer apparatus 850 is provided in the form of a container having a generally cylindrical sidewall 852 and a bottom end closure 854. A mass 856 of soldering composition is positioned in the container. An electrical resistance heating element 858 is positioned adjacent to the mass of soldering composition. The electrical heating element can be activated via line 860 to melt the soldering composition, and then deactivated to permit the soldering composition to solidify and seal. If desired or necessary, the soldering composition can be melted prior to insertion into the wellbore. When removal of the packer is desired, the electrical heating element can be reactivated to melt the solder and release the packer.

The sidewall 852 of the container is preferably formed from an elastomeric material such as a high temperature resistant synthetic rubber or a thin-walled ductile metal such as copper or aluminum. The mass of soldering composition is preferably formed from a material which expands in volume as it solidifies from liquid to solid. Preferably, the mass of soldering composition expands in volume in the range of 0.1 percent to 10 percent as it solidifies. A soldering composition which contains at least 10 parts per hundred of Bismuth is expected to give good service.

In the illustrated embodiment, a means 862, such as a pipe or running tool, is attached to the container for lowering the container into the wellbore. The line 860 attached to the heating element can be for connecting the heating element to a source of electrical power adequate to melt the soldering composition as well as for removing the heating element (and connecting line) from the wellbore for subsequent operations.

While certain preferred embodiments of the invention have been described herein, the invention is not to be construed as being so limited, except to the extent that such limitations are found in the claims.

What is claimed is:

1. Apparatus comprising
a tubing containing a plug which was cast in the tubing;
wherein the tubing extends downwardly into the earth and into a fluid production zone;
wherein the plug is formed from metal solder which has a melting point of less than 1100° F.;
and wherein the plug is cast in the tubing on a platform for the metal solder at a desired location in the tubing, by forming a pool of the metal solder in molten form on the platform, and
permitting the pool of molten metal solder to cool and solidify to form the plug.

2. Apparatus as in claim 1 wherein
the tubing is formed from steel, and
the plug forms a seal across the tubing,
wherein the metal solder contains at least 10 parts per hundred of Bismuth.

3. Apparatus as in claim 2 wherein
the steel tubing is formed from a sidewall having an inside surface and a longitudinal axis,
the inside surface defines at least one recess leading away from the longitudinal axis, and
the plug is positioned so that metal extends into the recess.

4. Apparatus as in claim 3 wherein
the inside surface of the tubing is generally cylindrically shaped, and
the plug has an outside surface which conforms to the generally cylindrical inside surface of the tubing, and at least one generally radially extending protrusion which conforms to the inside portion of the tubing which. defines the recess.

5. Apparatus as in claim 4 wherein
the tubing has a plurality of perforations which define the at least one recess in the generally cylindrical inside surface of the tubing;
and the plug has a plurality of protrusions which extend into the perforations to isolate the inside of the tubing from the outside of the tubing.

6. Apparatus as in claim 3 wherein
the tubing has a section which is perforated to define passages which lead from the inside to the outside of the tubing,
and the plug is positioned in the perforated section of the tubing.

7. Apparatus as in claim 3
wherein the recess in the generally cylindrical sidewall is formed by a perforation, and
a passage has been drilled longitudinally through the plug, so that the plug seals off the perforation.

8. Apparatus as in claim 7 wherein
the plug is formed from brazing material.

9. Apparatus as in claim 2 wherein
the tubing is formed from a first pipe section having a first end, and a second pipe section having a first end, and a collar which joins the first pipe section to the second pipe section with the first end of the first pipe section facing the first end of the second pipe section;

wherein an annular recess is formed between the first end of first pipe section and the first end of the second pipe section, and said plug is cast so that metal has flowed into the annular recess and formed a generally radially outwardly extending flange on the plug.

10. Apparatus as in claim 9 wherein the first pipe section has a first portion having a first diameter adjacent to the first end and a second portion having a second diameter which is larger than the first diameter which is spaced apart from the first end;

and said second pipe section has a first portion which has a first diameter adjacent to the first end and a second portion which has a second diameter which is larger than the first diameter and which is spaced apart from the first end;

and said plug has a first end which is positioned in the second portion of the first section and a second end which is positioned in the second portion of the second section.

11. Apparatus as in claim 2 further comprising a second tubing positioned inside of the tubing to define an annulus, wherein the tubing is an outside tubing and the second tubing is an inside tubing, and wherein the plug is positioned in the annulus.

12. Apparatus as in claim 11 wherein a lower portion of the annulus is filled with a cementitious material, and the plug is positioned above the cementitious material.

13. Apparatus as in claim 12 wherein the plug seals an upper portion of the annulus from a lower portion of the annulus.

14. Apparatus comprising a tubing containing a plug which was cast in the tubing, wherein the tubing is formed from steel, and the plug is formed from metal solder which has a melting point of less than 1100° F. and forms a seal across the tubing, wherein the steel tubing is formed from a sidewall having an inside surface and a longitudinal axis, wherein the inside surface defines at least one recess leading away from the longitudinal axis, and the plug is positioned so that metal extends into the recess, wherein the recess in the generally cylindrical sidewall is formed by corrosion or mechanical damage, and a passage has been drilled longitudinally through the plug, so that the plug forms a tubularly shaped repair body.

15. Apparatus as in claim 14 wherein the plug is formed from brazing material.

16. A method for isolating a first volume from a second volume in a passage which extends generally downwardly into the earth, wherein said passage contains a platform capable of supporting a pool of molten metal in the passage, said method comprising forming a pool of molten metal on the platform, and permitting the molten metal to solidify and cool so as to form a highly pressure resistant seal across the passage.

17. A method as in claim 16 wherein the first volume is inside of a tubing and the second volume is adjacent to the first volume.

18. A method as in claim 17 wherein the first volume and the second volume are adjacent volumes inside of the same tubing, wherein the molten metal expands as it solidifies to form a tight mechanical pressure seal.

19. A method as in claim 18 wherein the molten metal comprises a soldering composition.

20. A method as in claim 19 wherein the soldering composition contains at least 10 parts per hundred of Bismuth.

21. A method as in claim 19 wherein the soldering composition contains at least 50 parts per hundred of Bismuth.

22. A method as in claim 19 further comprising heating the tubing so that it diametrically expands, and permitting the tubing to diametrically shrink as the molten metal solidifies and cools.

23. A method as in claim 22 wherein the molten metal has a temperature in the range of 600–1100° F.

24. A method as in claim 23 wherein the molten metal comprises a brazing composition.

25. A method as in claim 18 wherein the tubing extends generally downwardly into the earth, said method further comprising positioning a platform for the molten metal in the tubing, and forming a pool of the molten metal on the platform.

26. A method as in claim 25 further comprising pouring molten metal onto the platform.

27. A method as in claim 26 further comprising conveying the molten metal onto the platform in an insulated wire-line bailing tool.

28. A method as in claim 27 further comprising positioning the platform so that the molten metal fills a collar recess.

29. A method as in claim 28 further comprising positioning a column of material onto the molten metal.

30. A method as in claim 25 further comprising pouring particles of soldering composition onto the platform to form a particulate mass and melting the particulate mass.

31. A method as in claim 30 further comprising melting the particulate mass on the platform by applying electrical resistance heating.

32. A method as in claim 26 wherein the platform extends across an annulus between an outer tubing and an inner tubing.

33. A method as in claim 32 further comprising melting the particulate mass on the platform by applying electrical resistance heating.

34. A method as in claim 33 further comprising lowering an electrical resistance heater into the inner tubing into a position alongside the particulate mass, and applying the heating through the wall of the inner tubing.

35. A method as in claim 25 further comprising lowering an electrical resistance heating probe which carries solidified soldering composition next to the platform, and actuating the electrical resistance heating probe to melt the soldering composition and form the pool of molten metal on the platform.

36. A method as in claim 35 further comprising removing the electrical resistance heating probe prior to permitting the mass of molten material to solidify.

37. A method as in claim 25 introducing molten material onto the platform from a tube which empties next to the platform.

38. A method as in claim 25 further comprising lowering a container of the soldering composition into a desired position in the tubing, wherein the container has a bottom end closure which forms the platform, and forming the pool of molten metal in the container.

39. A method as in claim 30 wherein the container has a generally cylindrical sidewall; and the molten material expands as it solidifies, so as to urge the sidewall of the container into sealing relationship with the inside surface of the tubing.

40. A method as in claim 39 wherein the sidewall is formed from a synthetic polymer material.

41. A method as in claim 39 wherein the sidewall is formed from a ductile metal.

42. Apparatus comprising a container formed from a generally cylindrical sidewall and a bottom end closure;

a mass of solidified soldering composition in the container; and an electrical resistance heating element embedded in the solidified mass of soldering composition.

43. Apparatus as in claim 42 wherein the mass of soldering composition is formed from a material which expands in volume as it solidifies from liquid to solid.

44. Apparatus as in claim 42 wherein the mass of soldering composition expands in volume in the range of 0.1 percent to 10 percent as it solidifies.

45. Apparatus as in claim 42 wherein the mass of soldering composition contains at least 10 parts per hundred of Bismuth.

46. Apparatus as in claim 42 wherein the sidewall of the container is formed from an elastomeric material.

47. Apparatus as in claim 46 further comprising means attached to the container for lower the container into a wellbore; and means attached to the heating element for connecting the heating element to a source of electrical power adequate to melt the soldering composition.

\* \* \* \* \*